United States Patent     [15]  3,681,396
Mookherjee et al.                [45]  Aug. 1, 1972

[54] PREPARATION OF CYCLOHEXADECANOLIDE

[72] Inventors: Braja D. Mookherjee, Matawan; William I. Taylor, Summit, both of N.J.

[73] Assignee: International Flavors & Fragrances Inc., New York, N.Y.

[22] Filed: March 11, 1970

[21] Appl. No.: 18,758

[52] U.S. Cl. ............. 260/343, 252/522, 260/617 M, 260/586 A, 260/348 C, 260/348.5 L
[51] Int. Cl. ............................................. C07d 9/00
[58] Field of Search ............................... 260/343

[56] References Cited
UNITED STATES PATENTS 3,189,619   6/1965   Aldridge et al. ............. 260/343

Primary Examiner—John M. Ford
Attorney—Brooks, Haidt & Haffner, Larimer P. Brooks, Alfred L. Haffner, Jr., Harold Haidt and G. Thomas Delahunty

[57] ABSTRACT

A process for preparing cyclohexadecanolide from 1,9-cyclohexadecadiene involving a number of steps. Monoepoxidized 1,9-cyclohexadecadiene is reduced to 9-cyclohexadecene-1-ol and oxidized to the corresponding unsaturated ketone and then hydrogenated to cyclohexadecanone. This upon oxidation in the presence of a boron trifluoride catalyst is converted into cyclohexadecanolide.

1 Claim, No Drawings

PREPARATION OF CYCLOHEXADECANOLIDE

BACKGROUND OF THE INVENTION

This invention relates to a process for the preparation of macrocyclic compounds for use in the perfume industry. More specifically, the present invention relates to a process for the preparation of cyclohexadecanolide from 1,9-cyclohexadecadiene. Additionally, this invention relates to the novel macrocyclic compound 9-cyclohexadecene-1-one. This compound is a useful intermediate in the synthesis of cyclohexadecanolide.

Cyclohexadecanolide is one of a group of compounds commonly classified as macrocyclic musks due to their characterisitc musk odor qualities. The odor of musk is perhaps the most universally appreciated fragrance and is usually thought of as the animal note in perfumes. A number of naturally occurring species, both of animal and vegetable origin, possess musk odor qualities, however, only three animal sources have achieved any commercial importance. It is because of the high demand and short supply of these naturally occurring musk odorants that numerous attempts have been made since the 1920's to synthesize compounds which would duplicate these desirable odors.

The macrocyclic lactones possess a most desirable type of musk odor and therefore have attracted much attention. Kirschbaum [Ber., 60B, 902 (1927) ] synthesized cyclopentadecanolide from ω-bromopentadecanoic acid which was converted to the silver salt and then lactonized. Ruzicka and Stoll [Helv. Chim. Acta, 11, 1159 (1928) ] found that macrocyclic ketones could be oxidized with Caro's acid into the corresponding lactones. Hunsdiecker [Chem. Ber. 80, 129, (1947) ] cyclized ω-iodo acids at high dilution in methylethyl ketone in the presence of excess potassium carbonate to form macrocyclic lactones. The high dilution methods have the disadvantage of being slow and cumbersome. More recently, a method of oxidative coupling of acetylenes has been used to synthesize macrocyclic lactones, see e.g., Raphael et al; Chem. & Ind., 559 (1960). Applicants, however, are unaware of any prior art process in which 1,9-cyclohexadecadiene is utilized as the starting material for the preparation of cyclohexadecanolide.

It is, therefore, an object of the present invention to provide a novel process for the preparation of cyclohexadecanolide.

It is a further object of the present invention to provide a process for the preparation of cyclohexadecanolide from 1,9-cyclohexadecadiene.

It is a still further object of the present invention to provide novel macrocyclic compounds.

Other objects of the present invention will be set forth in, or be apparent from the following detailed description of the invention.

THE INVENTION

These objects are achieved by the process of the present invention which comprises the steps of:

1. Epoxidizing 1,9-cyclohexadecadiene of the structure

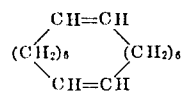

to form a monoepoxidized cyclohexadecadiene of the structure

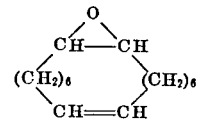

and

2. Reducing said monepoxidized cyclohexadecadiene to 9-cyclohexadecene 1-ol of the structure

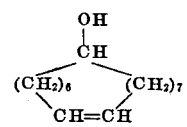

and

3. Oxidizing said 9-cyclohexadecene-1-ol to the corresponding ketone of the structure

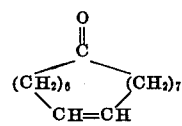

and

4. Hydrogenating the ketone to cyclohexadecanone of the structure

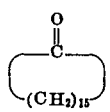

and

5. Oxidizing said cyclohexadecanone in the presence of boron trifluoride etherate to cyclohexadecanolide of the structure

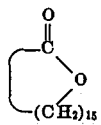

The 1,9-cyclohexadecadiene utilized as the starting material in the process of the present invention may be prepared by dimerizing cyclooctene as more fully disclosed in U.S. Pat. No. 3,439,056, granted on Apr. 15, 1969.

The first step of the process of the present invention comprises treating 1,9-cyclohexadecadiene with an oxidizing agent such as a peracid, e.g., peracetic acid, perpropionic acid, perbenzoic acid, perphthalic acid or other suitable peracid, in the presence of an alkalimetal carboxylate such as sodium acetate and in a suitable reaction medium such as an inert solvent at a reduced temperature. Suitable reaction media include methylene chloride, and the like.

The reactants are used in stoichiometic proportions, care being taken to insure that an excess of oxidizing agent is not employed in order to avoid the formation of diepoxycyclohexadecane. The reaction temperature and time are interdependent. Usually, a reduced temperature of from about −5°C. to about 10°C. is used, although a temperature of from 0°C. to about 5°C. is preferred. The reaction is for practical purposes completed within about 5 hours, preferably in about three hours. The desired product, 1,2-epoxy-9-cyclohexadecene, may be separated and recovered by conventional techniques including evaporation, distillation, solvent extraction and the like.

The second step of the process comprises treating 1,2-epoxy-9-cyclohexadecene with a reducing agent such as lithium aluminum hydride or hydrogen (in the presence of platinum or palladium) in a solvent such as ether or a similar inert vehicle. When lithium aluminum hydride is used as the reducing agent, the reaction temperature is preferably room temperature with care taken to keep the temperature below the boiling point of the solvent to prevent dehydration problems. Preferably, the reducing agent is utilized in a molar ratio of 1,2-epoxy-o-cyclohexadecene to reducing agent of about 1:0.25, although an excess of reducing agent can be utilized without any adverse effects. The desired 9-cyclohexadecene-1-ol may be recovered in any conventional manner.

The third step of the process involves oxidizing 9-cyclohexadecene-1-ol to the corresponding ketone with a suitable oxidizing agent such as chromic acid. This is generally accomplished in the presence of a strong mineral acid such as sulfuric acid and in the liquid phase such as an ether-water mixture. The oxidizing agent is utilized in excess and preferably in a molar ratio of oxidizing agent to 9-cyclohexadecene-1-ol of at least about 3:1 to insure completion of the oxidation reaction. The reaction temperature is preferably maintained at room temperature. The 9-cyclohexadecene-1-one may be recovered in any conventional manner.

The fourth step of the process comprises hydrogenating 9-cyclohexadecene-1-one to form cyclohexadecanone. This is performed with an hydrogenation catalyst sufficiently active to promote hydrogenation at low temperature and pressure, such as a Group VIII noble metal, for example, palladium or platinum.

The catalyst is preferably supported in a carrier such as activated carbon. The hydrogenation is accomplished in the liquid phase with an inert solvent such as lower aliphatic alcohols, for example, methanol, ethanol, butanol and the like. Hydrogen is passed into the apparatus until no more is absorbed showing completion of the reaction. The pressure is preferably atmospheric pressure, although pressures up to about 10 atmospheres can be utilized without any adverse effects and the temperature is preferably maintained at about room temperature. The desired product, cyclohexadecanone may be recovered in any conventional manner.

The fifth step of the process comprises treating cyclohexadecanone with a peracid oxidizing agent such as peracetic acid, perpropionic acid, perbenzoic acid, perphthalic acid or other suitable peracid in the presence of a boron trifluoride etherate catalyst and in a suitable reaction medium such as chloroform. The peracid oxidizing agent is utilized in excess and preferably in a molar ratio of peracid to cyclohexadecanone of at least about 3:1 to insure completion of the reaction. The reaction temperature may vary from about 40°C. to about 70°C., although preferably it is within the range of about 45°C. to about 50°C. The desired cyclohexadecanolide may be recovered in any convention manner. This step is more fully disclosed in the copending application, Mookherjee and Taylor, Process for the Preparation of Macrocyclic Lactones, Ser. No. 18,701 filed Mar. 11, 1970, now abandoned and continued as application Ser. No. 156,955 filed June 25, 1971, which is incorporated by reference herein.

The cyclohexadecanolide, also sometimes called dihydroambrettolide, prepared by the process of this invention, has a highly desirable and useful odor characterized as a musk odor and usually thought of as the animal note in perfumes. It can be utilized as a component of perfume compositions to promote a musk fragrance. Perfume compositions containing from about 1.0 percent to about 50.0 percent cyclohexadecanolide by weight based on the active fragrance ingredients before dilution are desirable and useful.

The following examples will illustrate in detail the manner in which the invention may be practices. It will be understood, however, that the invention is not confined to the specific limitations set forth in the individual examples, but rather to the scope of the appended claims.

All percentages and ratios in the following examples, as well as in the specification and the appended claims, are by weight, unless otherwise indicated.

EXAMPLE I

Preparation of Cyclohexadecanolide from 1,9-Cyclohexadecadiene

A. Preparation of 1,2-epoxy-9-cyclohexadecene from 1,9-cyclohexadecadiene

An apparatus consisting of a 100 ml. reaction flask equipped with an addition funnel, thermometer, mechanical stirrer and ice bath is charged with 5.0 g. (0.023 mole) 1,9-cyclohexadecadiene, 7.0 g. sodium acetate and 30 ml. of methylene chloride and cooled to 0°C. A solution containing 4.7 g. (0.023 mole) of 40 percent peracetic acid in 10 ml. of methylene chloride is then slowly added over a one-half hour period while maintaining the temperature at 0°C. and the mixture is then stirred for three hours at 0° to 5°C. and then permitted to return to room temperature. The mixture is then poured into a separatory funnel containing 40 ml. of water and the layers are separated. The aqueous layer is extracted three times with 30 ml. portions of methylene chloride. The combined organic layer is washed with a saturated sodium chloride solution until neutral, dried over anhydrous sodium sulfate and on removal of the solvent by rotary evaporator yields 5.58 g. of crude material. The crude material is then chromatographed to obtain 4.5 g. (84.2 percent yield) of 1,2-epoxy-o-cyclohexadecene.

B. Preparation of 9-cyclohexadecene-1-ol from 1,2-epoxy-9-cyclohexadecene

An apparatus consisting of a 500 ml. reaction flask equipped with an additional funnel, thermometer, mechanical stirrer, condenser and nitrogen supply is charged with 3.8 g. (0.0934 mole) of lithium aluminum hydride and 120 ml. of anhydrous ether and stirred. To this mixture is added dropwise a solution of 11.1 g. (0.0467 mole) of 1,2-epoxy-9-cyclohexadecene in 100 ml. of anhydrous ether over a period of one and one-half hours at room temperature. The mixture is then refluxed for three and one-half hours at 35°C. and then cooled to 0°C. and subsequently decomposed by the addition of 100 ml. of cold water. The ether layer is separated and the white precipitate is extracted three times with 50 ml. portions of ether. The combined ether extract is dried over sodium sulfate and evaporated to obtain 9.8 g. of crude material which is then chromatographed to obtain 8.75 g. (80 percent yield) of 9-cyclohexadecene-1-ol.

C. Preparation of 9-cyclohexadecene-1-one from 9-cyclohexadecene-1-ol

An apparatus consisting of a 250 ml. reaction flask equipped with an addition funnel, mechanical stirrer and condenser is charged with 8.7 g. (0.0372 mole) of 9-cyclohexadecene-1-ol and 60 ml. of ether. The oxidizing agent is prepared by mixing 6.0 g. of sodium chromate, 4.9 ml. of concentrated sulfuric acid and 25 ml. of water and it is then added dropwise to the solution in the reaction flask over a period of one-half hour at room temperature. The mixture is stirred for an additional three hours at room temperature and the resulting green mixture is extracted three times with 50 ml. portions of ether. The combined ether extract is washed twice with 10 ml. portions of a 5% sodium bicarbonate solution and with a saturated sodium chloride solution until neutral and then dried. The solvent is then evaporated yielding 8.6 g. of crude material. This crude material is then chromatographed to obtain 6.9 g. (80 percent yield) of 9-cyclohexadecene-1-one.

D. Preparation of Cyclohexadecanone from 9-cyclohexadecene-1-one

An apparatus consisting of a 500 ml. reaction flask equipped with a Brown's hydrogenation apparatus connected to a hydrogen cylinder is charged with 10 g. of 9-cyclohexadecene-1-one (2 isomers), 1.5 g. of a 10 percent palladium on carbon catalyst and 200 ml. of anhydrous methanol. Hydrogen is passed from the cylinder into the apparatus until no more is absorbed (940 ml.) at which point the reduction is complete. The catalyst is then carefully removed by suction filtration through a glass centered funnel covered with celite and upon evaporation of the solvent by rotary evaporation, 10.0 g. (100 percent yield) of the saturated ketone, cyclohexadecanone, is obtained.

E. Preparation of Cyclohexadecanolide from cyclohexadecanone

An apparatus consisting of a 100 ml. reaction flask equipped with an addition funnel, magnetic stirrer, theremometer and reflux condenser fitted with drying tube is charged with 2.15 g. (0.009 mole) of cyclohexadecanone and 18 ml. of chloroform. 0.45 ml. of freshly distilled 98 percent boron trifluoride etherate is then added over a period of 5 minutes and the temperature rises from 25° to 29°C. and the solution assumes an orange color. 5.13 g. (0.027 mole) of 40 percent peracetic acid is then added over a period of 15 minutes and the temperature rises to 33°C. and the solution becomes pale yellow. The temperature is then raised to 45°C. and the contents are stirred for eleven and one-half hours. The solution is then cooled and 20 ml. of water are added and the organic layer is extracted twice with 50 ml. of hexane and washed three times with 50 ml. portions of a saturated sodium chloride solution and dried over anhydrous sodium sulfate. The solvent is then removed in vacuo yielding 2.65 g. of crude material which is then chromatographed to obtain 0.963 g. of cyclohexadecanolide.

EXAMPLE II

A perfume composition is prepared by admixing the following ingredients in the indicated proportions:

| Ingredient | Parts |
| --- | --- |
| Geranium, Algerian | 100 |
| Clove | 100 |
| Cassia | 30 |
| Labdanum resin | 60 |
| Castoreum absolute | 10 |
| Sandal | 50 |
| Cedarwood | 150 |
| Ionone residues | 30 |
| Vetwert | 20 |
| Benzyl benzoate | 150 |
| Terpineol | 150 |
| Cyclohexadecanolide from Example I | 150 |
| Total: | 1000 |

This perfume composition is found to have a desirable musk fragrance quality.

EXAMPLE III

A total of 100 g. of soap chips is mixed with 1 g. of the perfume composition prepared in Example II until a substantially homogenous composition. This homogeneous composition is then pressed into a bar having a desirable musk scent.

What we claim is:

1. The process for the preparation of cyclohexadecanolide comprising the steps of:
   a. epoxidizing 1,9-cyclohexadecadiene with substantially a stoichiometric amount or less of a peracid to obtain 1,2-epoxy-9-cyclohexadecene;
   b. reducing the 1,2-epoxy-9cyclohexadecene with a reducing agent to obtain 9-cyclohexadecene-1-ol;
   c. oxidizing the 9-cyclohexadecene-1-ol with an oxidizing agent to obtain 9-cyclohexadecene-1-one;
   d. hydrogenating the 9-cyclohexadecene-1-one to obtain cyclohexadecanone; and
   e. oxidizing the cyclohexadecanone with a peracid oxidizing agent in the presence of a boron trifluoride etherate catalyst to obtain cyclohexadecanolide.

* * * * *